United States Patent
Skoyles

[11] 3,737,200
[45] June 5, 1973

[54] ANTI-LOCK VEHICLE BRAKE SYSTEMS

[75] Inventor: Derek Robert Skoyles, East Grinstead, England

[73] Assignee: U.S. Philips Corporation, New York, N.Y.

[22] Filed: June 11, 1971

[21] Appl. No.: 152,150

[30] Foreign Application Priority Data
June 26, 1970 Great Britain.....................31,132/70

[52] U.S. Cl................................................303/21 F
[51] Int. Cl. ...............................................B60t 8/06
[58] Field of Search............................303/6, 61–63, 303/68–69, 21; 188/181 A

[56] References Cited
UNITED STATES PATENTS

| | | | |
|---|---|---|---|
| 3,503,655 | 3/1970 | Heimler | 303/21 F |
| 3,524,684 | 8/1970 | Skoyles | 303/21 F |
| 3,556,615 | 1/1971 | Stelzer | 303/21 F |

*Primary Examiner*—Duane A. Reger
*Attorney*—Frank R. Trifari

[57] ABSTRACT

An anti-lock brake system having a brakefeed line which supplies fluid to the brakes. An elongated restrictor element is disposed in the brakefeed line to limit the volume of fluid being supplied to the brakes. The restrictor element is influenced by a piston which is urged into the restrictive position by fuild in a reservoir. The fluid is pumped into the reservoir, and hence acts upon the piston, when an anti-lock valve is actuated. The piston is spring-loaded towards a non-restricting position. The restrictor element has two constrictive sections which cooperate with constrictive wall sections to limit fluid flow.

4 Claims, 1 Drawing Figure

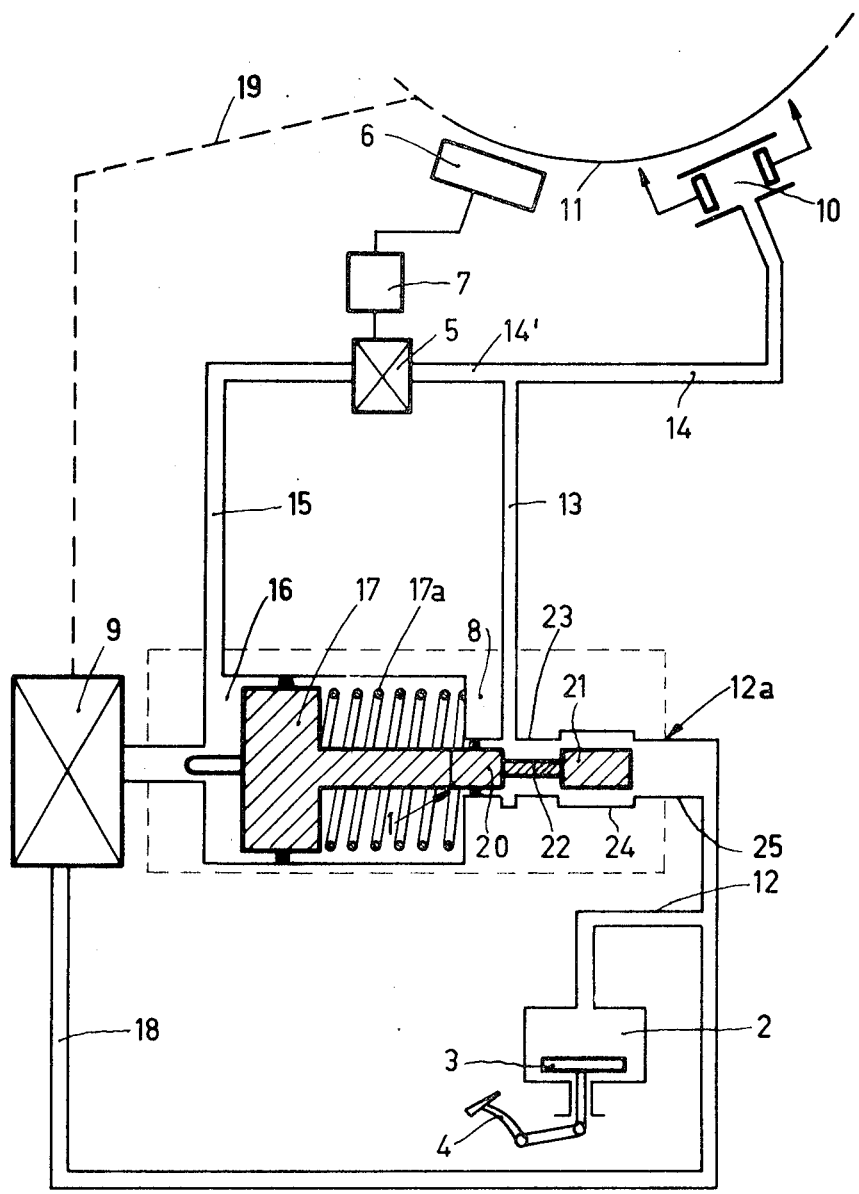

ANTI-LOCK VEHICLE BRAKE SYSTEMS

This invention relates to anti-lock brake systems for wheeled vehicles, that is, brake systems including means for improving braking performance of a vehicle by relieving braking pressure applied to a road wheel of the vehicle if the wheel tends to lock on a slippery surface following brake application and then increasing the braking pressure again without the need for any change in the actual braking action (by a person using the brake) causing the brake application. Such brake systems can be successful in reducing the risk of sliding due to wheel lock and in maintaining directional control during braking, and can also reduce braking distances.

The invention is a modification of the invention disclosed in co-pending patent application Ser. No. 58,348. According to the invention of this co-pending patent Application there is provided an anti-lock brake system for a wheeled vehicle which system includes a fluid pressure line for connection from a fluid pressure source to a wheel brake controlled by the system, an elongate slide member arranged for longitudinal movement into a section of said line which member is do dimensioned as to provide between itself and the inner wall of the section a clearance which forms a restricted fluid path in said section, and means for varying the extent of penetration of said slide member into said section during operation of the system to cause variation of the length of said fluid path and thus of the restriction afforded by it.

According to the present invention, said elongate slide member is dimensioned so as to comprise at least two restrictor portions which are separated by a narrower neck portion, each of which restrictor portions is adapted to provide between itself and a respective portion of said inner wall of the section a clearance which forms a restricted fluid path in said section. In this way, a given restriction can be attained with half (or proportionately less in the case of more than two restrictor portions) the extent of penetration of said slide member into said section that would be needed using an elongate slide member with only one effective restrictor portion.

The present invention has a particular application in a system according to claims the above identified co-pending patent application, in which system penetration of the elongate slide member into the section of line is controlled as a function reservoir fluid volume. The use of the present invention in such a system permits a reduction in reservoir dimensions because a given restriction can be attained, as aforesaid, with half (or less) the displacement of the slide member that was previously needed.

In order that the invention may be more fully understood reference will now be made by way of example to the accompanying drawing the single figure of which shows diagrammatically an anti-lock vehicle brake system embodying the invention.

Referring to the drawing, a two-stage elongate slide member 1 in accordance with the invention is provided in a particular form of anti-lock vehicle brake system which is described in greater detail than herein in co-pending patent application Ser. No. 215,622. This system is a master cylinder type hydraulic system comprising a master cylinder 2 having a piston 3 which is actuable by a brake pedal 4. The system further comprises an anti-lock control valve 5, a wheel movement sensor 6, an electrical control arrangement 7, a variable restrictor element 8 and a scavenging pump 9. A vehicle brake 10 for a wheel 11 is controlled by the system.

In operation of the system of FIG. 1 for normal brake application, fluid in pressure lines 12, 12a 13 and 14 is pressurised by the master cylinder 2 to an extent determined by a driver's braking action and this produces a corresponding braking pressure in the brake 10. If the driver's braking action is likely to cause skidding due to the wheel locking, this is detected by the wheel sensor movement sensor 6 and the electrical control arrangement 7, and the anti-lock control valve 5 is actuated. Details of the manner of the operation and the composition of the elements 5, 6 and 7 are not thought to be necessary for an understanding of the present invention, but an example is given in the aforementioned co-pending patent application Ser. No. 215,622 in conjunction with co-pending patent application Ser. No. 884,551.

As a result of the actuation of the anti-lock control valve 5, some of the fluid under pressure in the pressure lines 13 and 14 is displaced from the brake 10 into a relief connection 15, so that braking pressure is relieved. This fluid passes to a reservoir 16 of the variable restrictor element 8, where it is applied behind a spring loaded piston 17 and displaces this piston 17 right (as shown in the drawing) so that the two-stage elongate slide member 1 which is carried on the piston 17 enters the pressure line 12a thereby restricting flow of fluid through this line to the pressure line 13. Braking pressure is now reduced to an extent determined by the extent of displacement of the piston 17 to the right and thus to the volume of displaced fluid. For normal anti-lock operation, the anti-lock control valve 5 remains actuated for only a short time required to allow the braking pressure to fall sufficiently low for the wheel to reaccelerate. Once the control valve 5 is released, the pump 9, which is returning fluid from the reservoir 16 of the variable restrictor element 8 to the pressure line 12a via a pressure line 18, gradually removes sufficient fluid from the reservoir 16 for the piston 17 to return under its spring loading towards its normal position to increase the rate of braking pressure build-up . As indicated by the broken line 19 the pump 9 can be driven by the wheel 11.

Consider now in detail the two-stage elongate slide member 1 and the pressure line 12a in which it is adapted to penetrate. This slide member 1 comprises two restrictor portions 20 and 21 which are separated by a neck portion 22. The neck portion 22 is normally located in a portion 23 of the line 12a, and the restrictor portion 21 is normally located in a portion 24 of the line 12. In this position of the slide member 1, the latter does not impede flow of fluid from the master cylinder 2 to the brake 10. However, when the piston 17 is displaced to the right by reservoir fluid, slide member portion 20 enters pressure line portion 22 to form a first restricted fluid path, and slide member portion 21 enters a further pressure line portion 25 to form a second restricted fluid path. The result is that these two restricted fluid paths in series afford twice the restriction for a given displacement of the piston 17 than would be possible using a restrictor having only one effective restrictor portion, for example as shown in co-pending application Ser. No. 215,622.

What we claim is:

1. A fluid restrictor mechanism for an anti-lock braking system positioned between and communicating with a fluid pressure relief passage and a fluid brake-feed passage, said restrictor mechanism comprising:
   A. a fluid reservoir communicating with said relief passage;
   B. a movable element positioned for displacement within said reservoir, and movable between fluid restrictor positions and a non-restricting position;
   C. biasing means supported by said mechanism for urging said movable element toward said non-restricting position; and
   D. restricting means supported by said movable element and extending into said fluid brakefeed passage, said restrictor means comprising two spaced apart restrictor portions which cooperate with constricted wall segments of said fluid brake-feed passage to provide a restricted fluid path of a length determined by the extent of displacement of said movable element from its non-restricting position.

2. The fluid restrictor mechanism of claim 1, wherein said restrictor portions are separated by a narrower neck portion.

3. The fluid restrictor mechanism of claim 1, wherein said movable element is a piston that is displaceable against its biasing by a build up of fluid in said reservoir from said relief passage.

4. The fluid restrictor of claim 1, wherein said biasing means is a spring.

* * * * *